(No Model.)
J. SYDNEY.
PORTABLE APPLIANCE FOR SUPPORTING AND SUSPENDING CANDLES, LAMPS, OR FLOWERS.
No. 475,093. Patented May 17, 1892.
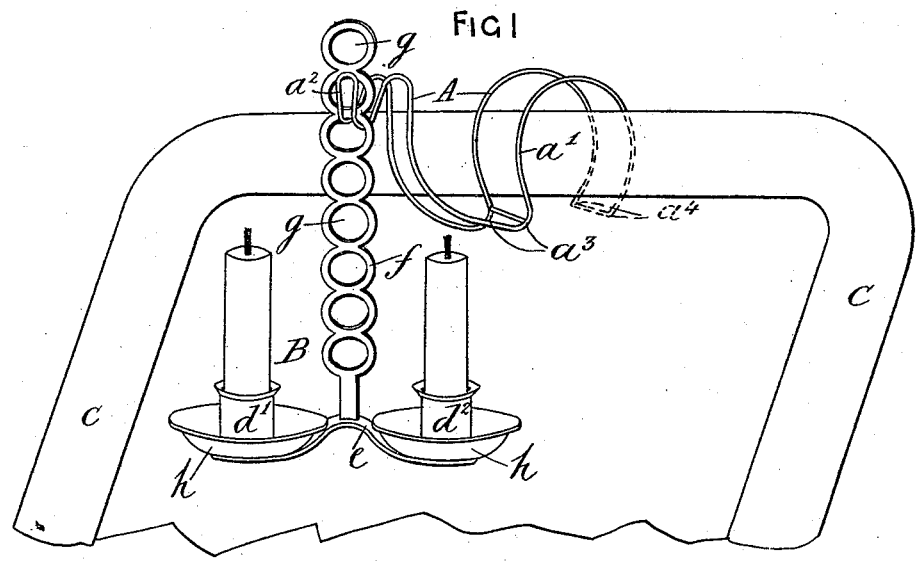
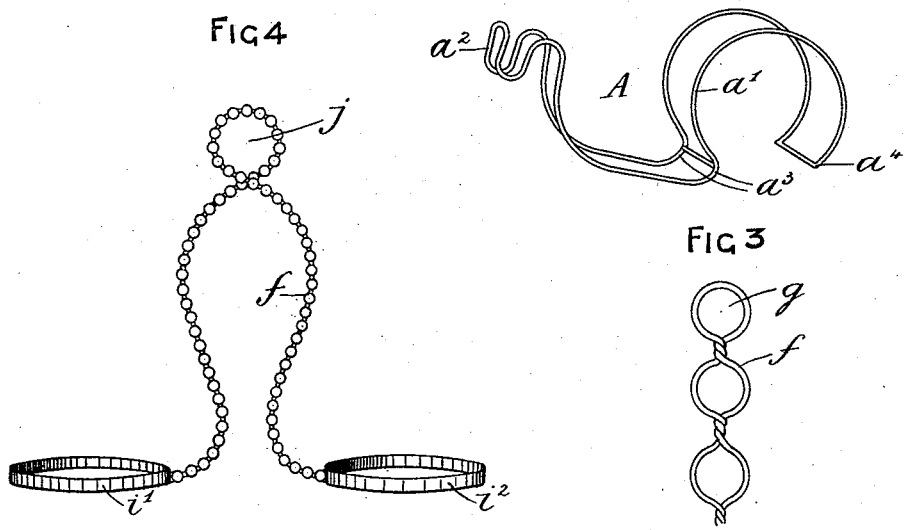
WITNESSES
George Herbert Bloye,
Herbert Whitehouse.
INVENTOR
James Sydney
by Charles Bosworth Ketley
ATTORNEY

UNITED STATES PATENT OFFICE.

JAMES SYDNEY, OF LONDON, ENGLAND.

PORTABLE APPLIANCE FOR SUPPORTING AND SUSPENDING CANDLES, LAMPS, OR FLOWERS.

SPECIFICATION forming part of Letters Patent No. 475,093, dated May 17, 1892.

Application filed February 27, 1891. Serial No. 383,070. (No model.)

*To all whom it may concern:*

Be it known that I, JAMES SYDNEY, a subject of Her Majesty the Queen of Great Britain, residing at Hampton Wick, near London, in the county of Middlesex, England, have invented certain new and useful Improvements in Portable Appliances for Supporting and Suspending Candles, Lamps, or Flowers, of which the following is a specification.

This invention consists in the herein-described improved portable appliance for supporting and suspending one or more candles or lamps or receptacles containing flowers before a toilet or other mirror or before a framed picture or from the front of a piano-forte, the said appliance being constructed so that it can readily be attached to or removed from the frames of mirrors and pictures or the fronts of piano-fortes of various thicknesses.

In the accompanying drawings, Figure 1 represents the said appliance in use on a mirror and constructed for holding two candles. Fig. 2 is a separate view of the clip-bracket forming part of the same. Fig. 3 shows a modified form of part of the candle, lamp, or flower holder of the same; and Fig. 4 shows a further modification of the candle, lamp, or flower holder part.

The said appliance consists of a bracket A, adapted to clip onto the frame of a mirror or picture, and a pendent candle, lamp, or flower holder B for suspending from the said bracket. The said bracket A is preferably made of a piece of wire doubled and bent, as shown, so as to form at one end a wide C-shaped clip $a'$ and at the other end a hook $a^2$. The extremities $a^3$ $a^4$ of the clip $a'$ can be sprung apart, so as to clip over the top of the frame C of a mirror or picture or the front of a piano-forte, from which the bracket A will then project.

When used for holding candles, the holder B has two candle-sockets $d'$ $d^2$, fixed as by the cross-arm $e$ to the bottom of the upright $f$, which has holes $g$, one above the other, to engage with the hooked end $a^2$ of the bracket A and thus be suspended therefrom. Around each of the candle-sockets $d'$ $d^2$ is an ordinary metal or other cup or dish $h$ to catch any grease falling from the candles. By means of the holes $g$ in the stem the height of the candles relatively to the mirror, picture, or piano-forte can readily be adjusted and the candles will always be upright or at an angle.

When the holder B is required to carry fairy or other lamps or a vessel for containing flowers, it is made with the necessary lamp-ring, such as $i'$ $i^2$, Fig. 4, in which the oil-vessels of the lamps or the vessels for containing flowers fit, instead of being made with the candle-sockets.

Fig. 3 shows a modified form of the upright $f$, made of wire twisted and formed into eyes, instead of being made from sheet metal, as in Fig. 1.

The candle, lamp, or flower holders, with adjustable stems $f$, Figs. 1 to 3, are more particularly suitable for toilet-glasses; but where the height of the candle, lamp, or flower containing vessel does not require to be adjusted the upright $f$ may be made with a single hole $j$ at the top, as in the example shown by Fig. 4.

It will be evident that the holder part B can, if desired, be made with more than two candle-sockets $d'$ $d^2$ or rings $i'$ $i^2$, so as to carry several candles, lamps, or flower-vessels.

What I claim as my invention, and desire to secure by Letters Patent, is—

1. An appliance for supporting and suspending candles, lamps, or flowers before a mirror or picture or the front of a piano-forte, consisting of a bracket formed as a C-clip at one end and a hook at the other, in combination with a candle, lamp, or flower holder, consisting of an upright part having two or more holes one above the other, adapted to engage with and be suspended from the hooked end of the said bracket and furnished with sockets or rings, for the purposes and substantially as set forth.

2. In combination with a bracket adapted to be attached to a mirror or picture or the front of a piano-forte for supporting candles, lamps, or flowers in front thereof, a candle, lamp, or flower holder, consisting of an upright part having two or more holes one above the other, adapted to engage with and be suspended from the hooked end of the said bracket and furnished with sockets or rings, for the purposes and substantially as set forth.

In testimony whereof I have signed in the presence of two subscribing witnesses.

JAMES SYDNEY.

Witnesses:
JAMES J. INGLIS,
JAMES EVANS.